United States Patent
Salciccia

(10) Patent No.: US 11,492,217 B2
(45) Date of Patent: Nov. 8, 2022

(54) RAILWAY VEHICLE AND PROCESS FOR MOVING GRAVEL

(71) Applicant: SRT SOCIETA' A RESPONSABILITA' LIMITATA CON SOCIO UNICO, Rome (IT)

(72) Inventor: Gilberto Salciccia, Rome (IT)

(73) Assignee: SRT SOCIETA' A RESPONSABILITA' LIMITATA CON SOCIO UNICO, Rome (IT)

( * ) Notice: Subject to any disclaimer, the term of this patent is extended or adjusted under 35 U.S.C. 154(b) by 197 days.

(21) Appl. No.: 16/894,384

(22) Filed: Jun. 5, 2020

(65) Prior Publication Data
US 2020/0385222 A1 Dec. 10, 2020

(30) Foreign Application Priority Data
Jun. 6, 2019 (IT) .......................... 102019000008289

(51) Int. Cl.
| | |
|---|---|
| *B65G 67/10* | (2006.01) |
| *B61D 7/32* | (2006.01) |
| *B65G 67/24* | (2006.01) |
| B65G 17/12 | (2006.01) |
| B65G 17/34 | (2006.01) |
| B65G 67/08 | (2006.01) |

(52) U.S. Cl.
CPC ............... *B65G 67/10* (2013.01); *B61D 7/32* (2013.01); *B65G 67/24* (2013.01); *B65G 17/123* (2013.01); *B65G 17/34* (2013.01); *B65G 67/08* (2013.01); *B65G 2814/0347* (2013.01)

(58) Field of Classification Search
CPC ........ B65G 67/10; B65G 67/08; B65G 67/24; B65G 17/123; B61D 7/32
See application file for complete search history.

(56) References Cited

U.S. PATENT DOCUMENTS

| | | | |
|---|---|---|---|
| 2014/0271071 A1* | 9/2014 | Aaron ...................... | B61D 7/00 414/528 |
| 2016/0052528 A1 | 2/2016 | Lichtberger | |
| 2016/0186566 A1* | 6/2016 | Stanford ................ | B65G 15/00 414/528 |

FOREIGN PATENT DOCUMENTS

| | | |
|---|---|---|
| EP | 3 282 054 | 2/2018 |
| WO | 2013/018052 | 2/2013 |

OTHER PUBLICATIONS

Search Report for IT201900008289, dated Feb. 20, 2020, 12 pages.

* cited by examiner

*Primary Examiner* — Saul Rodriguez
*Assistant Examiner* — Willie Berry, Jr.
(74) *Attorney, Agent, or Firm* — Nixon & Vanderhye P.C.

(57) ABSTRACT

A railway vehicle for moving material includes a first and a second railway wagon, each of which extend between respective first and a second end portion the first and second railway wagons engaged at the second end portion of the first railway wagon and at the first end portion of the second railway wagon, wherein the first and second railway wagons each include: a platform, a carriage, a conveyor carried by the platform and having an operating section configured to move the material along a advancement direction. The railway vehicle includes a connection device carried by at least one of the first and second railway wagons (and configured to define an intermediate section for connecting the operating sections of the conveyors of the first and second railway wagons.

20 Claims, 9 Drawing Sheets

RAILWAY VEHICLE AND PROCESS FOR MOVING GRAVEL

RELATED APPLICATION

This application claims priority to Italian patent application Italian patent application 102019000008289 filed Jun. 6, 2019, the entirety of which is incorporated by reference.

FIELD OF INVENTION

The present invention is a railway vehicle for moving material, e.g. gravel. The invention can be applied in the railway sector for the maintenance of railway infrastructures.

STATE OF THE ART

Vehicles are known in the railway field for transporting gravel for making/maintaining railway ballast. These vehicles are used for transporting the gravel from loading stations to the work sites where the gravel is unloaded for making or maintaining the railway line.

The vehicles comprise a plurality of wagons (or rolling stock) engaged one after the other by means of known hooks and axially spaced by means of bumpers; each wagon is constituted by a platform supported by a pair of carriages, on which a container for the gravel is arranged. The container is closed at the sides and open only at the top. In the container, a conveyor belt is present which is configured to move the gravel within the container itself along a longitudinal extension of the wagon. Each wagon also comprises an auxiliary conveyor configured to pick up the gravel from the conveyor belt, move it outward from the top of the container of a wagon and finally pour it within a container of an adjacent railway wagon.

In detail, the auxiliary conveyor comprises a tilted lifting section placed within the container of a first wagon and an upper section extending between the top of said first wagon and the top of an immediately consecutive second wagon; the gravel is picked up from the conveyor belt and extracted from the container of the first wagon due to the tilted section which directly serves the upper section adapted to pour the picked-up gravel within the container of the second wagon.

European patent application EP 3 282 054 A1 discloses a train convoy for transporting inert material for remaking railway ballast. The convoy comprises a plurality of railway wagons, each of which provided with a loading bed and with a lower and upper conveyor belt: both lower and upper belts have an end portion movable by rotation along a horizontal axis, in a manner such that said belt portion can be arranged in proximity to a respective upper or lower belt of an adjacent railway wagon.

The Applicant has indicated that the above-described known solutions have considerable limitations and drawbacks. Indeed it must in fact be indicated that each wagon must have at least two distinct conveyor belts in order to allow the passage of the gravel between one wagon and the next; such double-conveyor structure, in addition to negatively affecting the complexity of the entire vehicle, also adds to the weight of each wagon, thus compromising the overall load capacity thereof. Moreover, it must be indicated that the presence of tilted conveyor belts requires the installation of a high-power motor (electric motors or hydraulic actuators activated by a pressurized fluid), independent of the motor adapted to move the wagon, capable of ensuring the lifting/movement of the gravel. The complex structure of the above-described known vehicles also affects the production costs as well as the number of interventions necessary for the maintenance and repair thereof.

Also known, from patent applications No. WO 2013/018052 A1 and US 2014/271071 A1, are train convoys for moving gravel. Such train convoys comprise two or more railway wagons, each of which provided with a loading bed within which a conveyor belt for moving gravel is housed; the conveyor belt of each wagon has a head end portion that emerges longitudinally from the loading bed and is superimposed on a tail portion of a conveyor belt of an adjacent railway wagon; in this manner, each conveyor belt of a wagon is configured to move and arrange the gravel above the conveyor belt of an immediately adjacent wagon.

Even if the convoys described in the patent applications WO 2013/018052 A1 and US 2014/271071 A1 have a simpler and more compact structure with respect to the convoys described above (e.g. in the European patent application No. EP 3 282 054 A1), the Applicant has indicated that also such convoys are not free of limitations and drawbacks. It is in fact indicated that the conveyor belts of the applications WO 2013/018052 A1 and US 2014/271071 A1 require high extensions and a particularly strong structure due to the presence of a belt section projecting cantilevered from the wagon.

The bulky structure of the conveyor belts of patent applications WO 2013/018052 A1 and US 2014/271071 A1, in addition to negatively affecting the complexity of the entire vehicle and the production costs, adds to the weight of each wagon, thus compromising the overall load capacity.

Also known from patent application US 2016/052528 A1 is a train convoy for moving inert material, e.g., aggregate, for remaking a railway ballast. The convoy comprises a plurality of railway wagons, each of which provided with a loading bed within which a conveyor belt is housed. At junction zone between one wagon and the next, the convoy has a connection device adapted to place in communication the conveyor belts of two adjacent wagons; in particular, the connection device comprises a first plate, associated with the transportation of a first wagon, and a second plate, associated with the conveyor belt of a second wagon adjacent to the first wagon, which is at least partly superimposed on the first plate. The first and the second plate define a kind of bridge adapted to allow the inert material to pass from one conveyor belt to another. The Applicant deems that also the solution described in the United States patent application US 2016/052528 A1 can be improved with regard to several aspects.

SUMMARY

The present invention may be embodied to provide a railway vehicle capable of efficiently moving large quantities of material for making or maintaining railway ballast, both when the railway vehicle is moving and when the vehicle is stopped. The invention may embodied to provide a railway vehicle capable of quickly moving material along the wagon. The invention may be embodied to provide a railway vehicle having a simple and compact structure, in particular having limited production and maintenance costs.

The invention may be embodied as a railway vehicle (100) for moving material, e.g. inert (aggregate) material and/or gravel, comprising at least one first and one second railway wagons (1, 50), each of said first and second railway wagons (1, 50) longitudinally extending between a first and a second longitudinal end portions (2, 3), wherein said first and second railway wagons (1, 50) are engaged with each other at the second longitudinal end portion (3) of the first railway wagon (1) and at the first longitudinal end portion (2) of the second railway wagon (50), wherein each of said first and second railway wagons (1, 50) comprises: at least one platform (4), at least one carriage (5) configured to support the platform (4) and allow the movement of the railway wagon along rails, at least one conveyor (6) carried by the platform (4) and having an operating section (To) configured to receive said material, the conveyor (6) being configured to move the material relative to the platform (4) at least along a advancement direction (A) between the first and the second longitudinal end portion (2, 3) of the railway wagon.

The railway vehicle (100) may comprise at least one connection device (7) carried by at least one of said first and second railway wagons (1, 50) and configured to define an intermediate section (Ti) of connection of the operating sections (To) of the conveyors (6) of the first and second railway wagons (1, 50).

The connection device (7) may comprise at least one first support element (8) extending as an extension of the operating section (To) of the conveyor (6) of the first railway wagon (1), approaching the conveyor (6) of the second wagon (50). At least part of the first support element (8) may emerge from the conveyor (6) of the first railway wagon (1). At least part of the first support element (8) may emerge from the second longitudinal end portion of the first railway wagon (1), approaching the second railway wagon (50).

The connection device (7) may comprise at least one second support element (9) extending as an extension of the operating section (To) of the conveyor (6) of the second wagon (50), approaching the conveyor (6) of the first wagon (1). At least part of the second support element (9) may emerge from the conveyor (6) of the second railway wagon (50). At least part of the second support element (9) may emerge from the first longitudinal end portion (2) of the second railway wagon (50) approaching the first railway wagon (1).

The first and second support elements (8, 9) of the connection device (7) may have respective receiving surfaces of the material, optionally inert material and/or gravel. The first and second support elements (8, 9) of the connection device (7) may be at least partly superimposed on each other along a direction transverse, optionally orthogonal, to said receiving surfaces of the inert material and/or gravel.

The first support element (8) may comprise a plate having at least one flat section (8b). The plate of the first support element (8) may comprise a raised section (8a) emerging from the operating section (To) of the conveyor (6) of the first wagon (1), said raised section (8a) being interposed between the flat section (8b) of said plate of the first support element (8) and the operating section (To) of the conveyor (6) of the first railway wagon (1).

The second support element (9) may comprise a plate having at least one flat section (9a). The second support element (9) may be entirely constituted by a flat plate.

The plate of the second support element (9) may be at least partly arranged, in conditions of use of the railway vehicle (100), below the plate of the first support element (8).

The flat plate of the second support element (9) may be placed partially below the flat section (8b) of the plate of the first support element (8).

The connection device (7) may comprise at least one auxiliary support element (10) facing the first support element (8), with respect to a direction orthogonal to the platform (4), wherein the auxiliary support element (10) defines, in cooperation with the first support element (8), a guide (11) adapted to receive the second support element (9).

The auxiliary support element (10) may be spaced from the first support element (8) with respect to a direction transverse, in particular orthogonal, to the receiving surface of the material, optionally the inert material and/or gravel, of said first support element (8).

The auxiliary support element (10) may be, in conditions of use of the railway vehicle (100), placed below the first support element (8).

The auxiliary support element (10) may comprise a flat plate facing the first support element (8). The plate of the auxiliary support element (10) may extend parallel to the flat section (8b) of the first support element (8).

The flat plate of the auxiliary support element (10) may be spaced from the flat section (8b) of the first support element along a direction orthogonal to a lying plane of said flat section (8b).

The flat plate of the second support element (9) may extend parallel to the flat section (8b) of the first support element (8).

The flat plate of the second support element (9) may be interposed between the auxiliary support element (10) and the first support element (8). The flat plate of the second support element (9) may be interposed between the flat plate of the auxiliary support element (10) and the flat section (8b) of the first support element (8).

The flat plate of the second support element (9) may be slidably engaged within the guide (11) defined between first support element (8) and auxiliary support element (10).

The operating section (To) may be on a plane.

The flat section (8b) of the first support element (8) may be parallel to the lying plane of the operating section (To) of the conveyor (6) of the first wagon (1). The flat plate of the auxiliary support element (10) may be parallel to the lying plane of the operating section (To) of the conveyor (6) of the first wagon (1). The second support element (9) may be parallel to the lying plane of the operating section (To) of the conveyor (6) of the second railway wagon (50). The first support element (8) may be constrained to the first railway wagon (1). The first support element (8) may be constrained to the conveyor (6) of the first railway wagon (1).

The second support element (9) may be constrained to the second railway wagon (50). The second support element (9) may be constrained to the conveyor (6) of the second railway wagon (50).

The conveyor (6) of each railway wagon may comprise: at least one drive element (12) arranged according to a closed path, and a plurality of plates (13) constrained to the drive element (12) and movable together with the latter, the plates of said plurality are configured to define the operating section (To) and move the material, optionally the inert material and/or gravel, along the advancement direction (A).

Each plate (13) may extend mainly along a direction orthogonal to the advancement direction (A), optionally parallel to the operating section (To). The plates (13) may flanked each other along the entire closed path of the drive element (12). The plates may be uniformly arranged along the entire closed loop path defined by the drive element (12).

The closed loop path defined by the drive element (12) may comprise: a straight forward section (12a), a straight return section (12b), a first and a second curved connecting sections (12c, 12d) which connect the forward section and the return section, wherein said first and second sections have respective concavities facing each other, wherein the straight forward section (12a), in conditions of use of the railway vehicle, is placed above the straight return section (12b). At least one part of the plates (13) may be arranged on the straight forward section (12a) define the operating section (To) of the conveyor (6).

Each plate (13) may have a flat upper surface configured to abuttingly receive the material, optionally the inert material and/or gravel. The plates (13) may be externally engaged with the drive element (12).

Each plate (13) may extend in thickness between an outer surface and an inner surface, wherein the inner surface of each plate is facing towards the drive element (12) while the outer surface is facing the opposite side with respect to the closed loop path defined by said drive element (12).

Each plate (13) may comprise: a central body (13a), a front projection (13b) emerging from the central body (13a), a rear projection (13c) emerging from the central body (13a) on the opposite side with respect to the front projection (13b), wherein the front projection (13b) of a plate (13) is configured to be superimposed on a rear projection of an adjacent and immediately consecutive plate (13).

The central body (13a) and the front projection (13b) may define the upper surface of the plate (13) configured to abuttingly receive the material, optionally the inert material and/or gravel.

The drive element (12) may comprise at least one selected from the group between: at least one chain, at least one belt.

The drive element (12) may comprise at least one actuator (14) configured to move said chain and/or belt, optionally said actuator (14) comprises a motor, e.g. an electric motor. The chain or belt may be wound around at least two toothed wheels (15) of the drive element (12) configured to engage and guide in motion said chain or belt. At least one of said toothed wheels (15) may be connected to the actuator, e.g. an electric motor, in order to define a drive wheel configured to move said chain or belt.

The drive element (12) may comprise: at least one first chain or one first belt arranged at a first transverse end of the plurality of plates, and at least one second chain or second belt arranged at a second transverse end of the plurality of plates opposite said first transverse end.

The conveyor (6) may extend longitudinally between the first and the second longitudinal end portions (2, 3) of the railway wagon, wherein the conveyor (6) of each wagon extends transversely between a first and a second transverse end portions (2", 3"), wherein the railway vehicle (100) also comprises at least one first and one second lateral walls (16a, 16b) opposite each other and emerging respectively from the first and second transverse end portions (2", 3") of the conveyor (6), on the side opposite the platform (4), wherein the conveyor (6), together with the first and second lateral walls (16a, 16b), define a housing space (17) for containing material, optionally inert material and/or gravel.

The first and the second lateral wall (16a, 16b) may extend along the entire longitudinal development of the conveyor (6).

Between a railway wagon and an adjacent railway wagon there need be no stop elements of the material, optionally the inert material and/or gravel. Between each railway wagon there need be no transverse lateral walls interposed between a conveyor of said railway wagon and the conveyor of an adjacent railway wagon.

The first lateral walls (16a) of two adjacent railway wagons may be spaced from each other to define a first lateral opening, and wherein the second lateral walls (16b) of two adjacent railway wagons are also spaced from each other to define a second lateral opening, The railway vehicle (100) may comprise a containment device (18) configured to at least partly occlude said first and second lateral openings defined between two adjacent railway wagons.

The containment device (18) may comprise at least one first occlusion element (19) engaged at the first lateral wall (16a) of a railway wagon and extending towards the first lateral wall (16a) of an adjacent railway wagon.

The first occlusion element (19) may extend as an extension of the first lateral wall (16a) of a railway wagon up to being superimposed at least partly on the first lateral wall (16a) of an adjacent railway wagon to at least partly occlude said first lateral opening.

The first occlusion element (19) may comprise at least one laminar coating body (19a), optionally said laminar coating body (19a) being made of plastic material, e.g. polyethylene.

The first occlusion element (19) may comprises: at least one first containment plate (19b) engaged with the first lateral wall (16a) of the first railway wagon (1) and extending towards the first lateral wall (16b) of the second railway wagon (50), at least one second containment plate (19c) engaged with the first lateral wall (16a) of the second railway wagon and extending towards the first lateral wall of the first railway wagon, and at least one connection body (19d) fixed and interposed between said first and second containment plates (19b, 19c), said connection body (19d) being configured to define a constraint of hinge type between said first and second containment plates (19b, 19c).

The laminar coating body (19a) of the first occlusion element may be placed to cover the first containment plate (19b), the second containment plate (19c) and the connection body (19d) of the same first occlusion element (19) on one side facing towards the second lateral wall of a railway wagon.

The containment device (18) may comprise at least one second occlusion element (20) engaged at the second lateral wall (16b) of a railway wagon and extending towards the first lateral wall (16b) of an adjacent railway wagon. The second occlusion element (20) may extend as an extension of the second lateral wall (16b) of a railway wagon up to being superimposed at least partly on the second lateral wall (16b) of an adjacent railway wagon to occlude at least partly said second lateral opening. The second occlusion element (20) may comprise at least one laminar coating body (20a), optionally said laminar coating body (20a) being made of plastic material, e.g. polyethylene.

The second occlusion element (20) may comprises: at least one first containment plate (20b) engaged with the second lateral wall (16b) of the first railway wagon and extending towards the second lateral wall of the second railway wagon, at least one second containment plate (20c) engaged with the second lateral wall (16b) of the second railway wagon and extending towards the second lateral wall of the first railway wagon, and at least one connection body (20d) fixed and interposed between said first and second containment plates (20b, 20c) of the second occlusion element, said connection body (20d) of the second occlusion element being configured to define a constraint of hinge type between said first and second containment plates (20b, 20c) of said second occlusion element.

The laminar coating body (20a) of the second occlusion element (20) may be placed to cover the first containment plate (20b), the second containment plate (20c) and the connection body of the same second occlusion element (20) on one side facing towards the first lateral wall (16a) of a railway wagon.

The vehicle may comprise at least one tail railway wagon longitudinally extending between a first and a second longitudinal end portion (2, 3), wherein said tail railway wagon is engaged, at the second longitudinal end portion (3), with the first longitudinal end portion (2) of the first or second railway wagon, wherein said tail railway wagon comprises: at least one platform (4), at least one carriage (5) configured to support the platform (4) and allow the movement of the tail railway wagon along rails, at least one conveyor (6) carried by the platform (4) and having an operating section (To) configured to receive the material, the conveyor (6) being configured to move the material relative to the platform (4) at least along a advancement direction (A) between the first and the second longitudinal end portion (2, 3) of the tail railway wagon, at least one first and one second lateral wall (16a, 16b) opposite each other and emerging respectively from a first and second transverse end portions of the conveyor (6) on the side opposite the platform (4), wherein the conveyor (6), together with the first and second lateral walls (16a, 16b), define a housing space (17) for containing material, at least one tail lateral wall (25) emerging from the platform (4) and connecting the first and second lateral walls (16a, 16b) of the tail railway wagon.

The tail lateral wall (25), together with the first and second lateral walls (16a, 16b) of the tail railway wagon, may define a housing space (17) delimited at the top by a free edge.

The tail railway wagon may comprise a loading conveyor arranged at said free edge and configured to move material within the housing space (17).

The vehicle may comprise an unloading conveyor (27) carried by the platform (4) of at least one railway wagon, said unloading conveyor being configured to receive the material, optionally the inert material and/or gravel, from the conveyor (6) of a railway wagon and pour it outside the latter.

The railway wagon may be provided for moving material, optionally the inert material and/or gravel, said railway wagon longitudinally extending between a first and a second longitudinal end portions (2, 3), said railway wagon comprising: at least one platform (4), at least one carriage (5) configured to support the platform (4) and allow the movement of the railway wagon along rails, and at least one conveyor (6) carried by the platform (4) and having an operating section (To) configured to receive said material, the conveyor (6) being configured to move the material, optionally the inert material and/or gravel, relative to the platform (4) at least along an advancement direction (A) between the first and the second longitudinal end portions (2, 3) of the railway wagon.

The railway wagon may comprise at least one connection device (7) configured to define an intermediate section (Ti) of connection between the operating section (To) of the railway wagon and an operating section (To) of a further conveyor (6) of an adjacent railway wagon.

The railway wagon may be provided for moving material, optionally the inert material and/or gravel, said railway wagon longitudinally extending between a first and a second longitudinal end portion (2, 3), said railway wagon comprising: at least one platform (4), at least one carriage (5) configured to support the platform (4) and allow the movement of the railway wagon along rails, and at least one conveyor (6) carried by the platform (4) and having an operating section (To) configured to receive said material, the conveyor (6) being configured to move the material, optionally inert material and/or gravel, relative to the platform (4) at least along an advancement direction (A) between the first and the second longitudinal end portions (2, 3) of the railway wagon.

The railway wagon may comprise at least one connection device (7) configured to receive the material from the conveyor and move it outside a lateral size of said railway wagon.

The connection device (7) may be configured to define an intermediate section (Ti) of connection between operating sections (To) of adjacent railway wagons.

The containment device (18) may be configured to occlude at least one lateral opening defined between two adjacent railway wagons. The containment device may comprise at least one first occlusion element (19) configured to be engaged at a first lateral wall (16a) of a railway wagon and extending towards a first lateral wall (16a) of an adjacent railway wagon.

The first occlusion element (19) may be configured to be extend as an extension of the first lateral wall (16a) of a railway wagon up to being superimposed at least partly on the first lateral wall (16a) of an adjacent railway wagon to at least partly occlude said lateral opening.

The first occlusion element (19) may comprises at least one laminar coating body (19a), optionally said laminar coating body (19a) being made of plastic material, e.g. polyethylene.

The first occlusion element (19) may comprise: at least one first containment plate (19b) engageable with a first lateral wall (16a) of a first railway wagon (1) and extending towards a first lateral wall (16b) of a second railway wagon (50), at least one second containment plate (19c) engageable with the first lateral wall (16a) of the second railway wagon and extending towards the first lateral wall of the first railway wagon, and at least one connection body (19d) configured to be fixed and interposed between said first and second containment plates (19b, 19c), said connection body (19d) being configured to define a constraint of hinge type between said first and second containment plates (19b, 19c).

A process for moving material, such as inert material and/or gravel, by means of a railway vehicle. The process may comprise the following steps: preparing material on the conveyor (6) of a first railway wagon (1), moving the material by means of the conveyor of the first railway wagon (1) along the advancement direction (A) between the first and the second end portion (2, 3) of said first railway wagon (1), and advancing said material on the connection device (7) so as to move the material onto the conveyor (6) of the second railway wagon (50) adjacent to the said first railway wagon (1).

The process may comprise a step for moving the material on the conveyor of the second railway wagon (50) along the advancement direction (A) between the first and the second end portion (2, 3) of the second railway wagon (50).

The step of preparing material on the conveyor of the first railway wagon may comprises the following steps: picking up material from a feed station, moving said picked-up material, by means of a loading conveyor, onto the railway vehicle (100), and moving said material, by means of an unloading conveyor, outside the housing space.

In a further aspect, it is provided to use a railway wagon in accordance with any one of the preceding aspects for the transport and movement of gravel.

SUMMARY OF THE DRAWINGS

Several embodiments and several aspects of the finding will be described below with reference to the enclosed drawings, provided only as a non-limiting example wherein.

DETAILED DESCRIPTION

Definitions And Conventions

Figure 1:
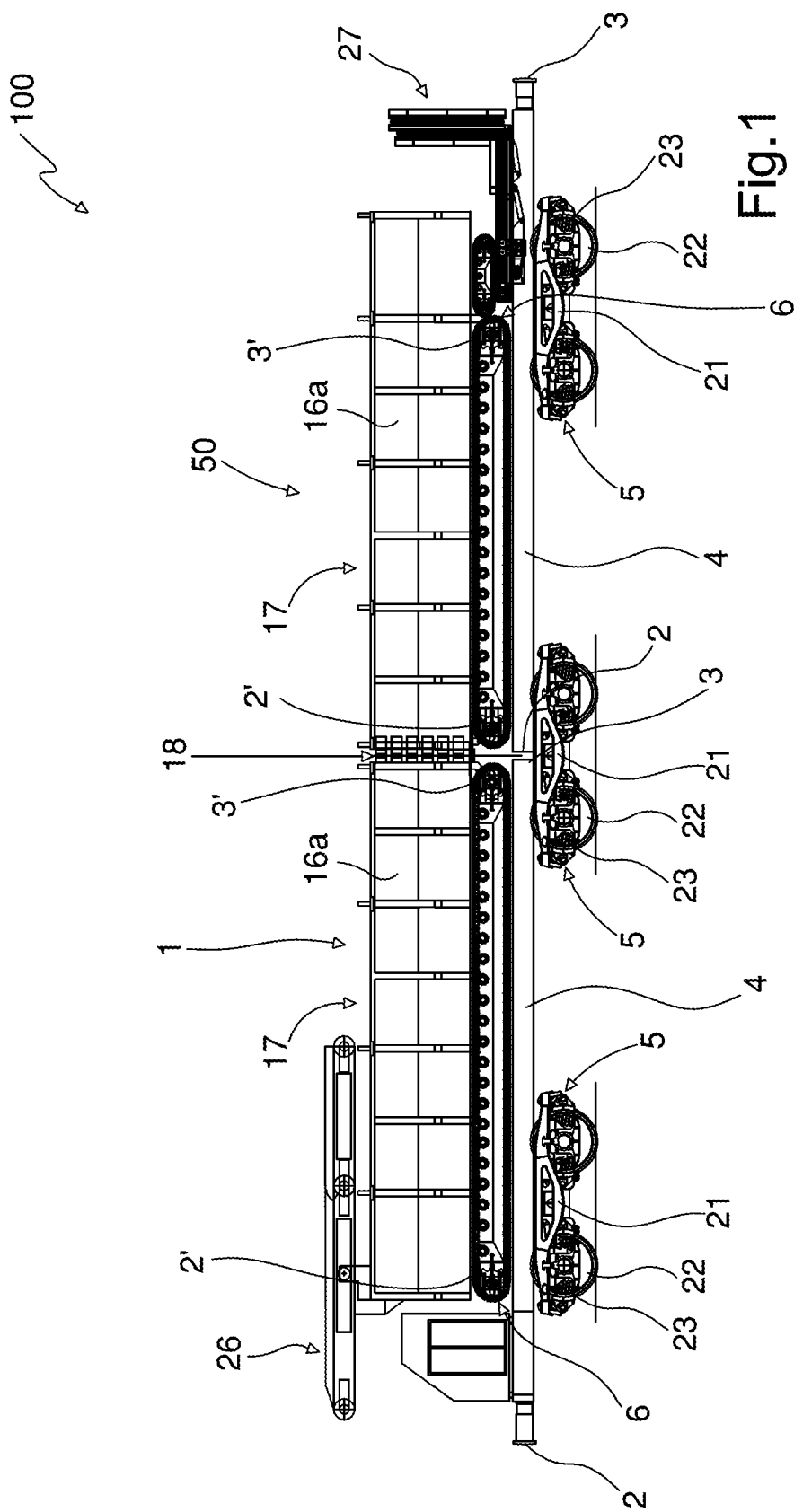
FIG. 1 is a side view of a railway vehicle comprising a plurality of railway wagons.

It is observed that in the present detailed description, corresponding parts illustrated in the various figures are indicated with the same reference numbers. The figures could illustrate the object of the invention by means of representations that are not in scale; therefore parts and components illustrated in the figures relative to the object of the invention could only regard schematic representations.

Control Unit

The railway vehicle described and claimed herein may comprise at least one control unit set to control operative conditions implemented by the same vehicle and/or to control the steps of the process.

The control unit may be a single unit or it may be formed of a plurality of distinct control units depending on the design selections and on the operative requirements.

With the term control unit, it is intended a component of electronic type which may comprise at least one of: a digital processor (CPU), an analog circuit, or a combination of one or more digital processors with one or more analog circuits. The control unit may be "configured" or "programmed" to perform some steps: this may be done in practice by any means that allows configuring or programming the control unit. For example, in the case of a control unit comprising one or more CPUs and one or more memories, one or more programs may be stored in suitable memory banks connected to the CPU or to the CPUs; the program or programs contain instructions which, when executed by the CPU or by the CPUs, program or configure the control unit to perform the operations described in relation to the control unit. Alternatively, if the control unit is or comprises circuitry of analog type, then the control unit circuit may be designed to include circuitry configured, in use, for processing electrical signals in a manner such to perform the steps relative to the control unit.

Actuator

With the term actuator it is intended any one device capable of causing movement on a body, for example on a command of the control unit (reception by the actuator of a command sent by the control unit). The actuator may be of an electric, pneumatic, mechanical (for example with a spring), hydraulic type, or of another type.

Material

With the term material it may be intended inert material and/or gravel.

With the term inert material it is intended aggregates comprising rough granular mineral materials of natural and/or artificial type. The aggregates may comprise at least one selected from the group between: sand, gravel, expanded clay, vermiculite and perlite.

With the term gravel it is intended gravel for railway ballast. The gravel may be at the natural state or obtained via crushing of rocks. The gravel may be obtained artificially and by means of suitable plants for crushing, screening and washing of gravel or natural rocks. The gravel may comprise a grain size comprised between 10 and 80 mm; it may also have a limited content of fine particles (powders) and a pointy shape.

Railway Vehicle

Reference number 100 indicates a railway vehicle for transporting material, e.g. gravel, for making and/or maintaining railway ballast.

The vehicle 100 may comprise a plurality of railway wagons; in the enclosed figures, a railway vehicle 100 is illustrated in a non-limiting manner, exclusively comprising a first railway wagon 1 and a second railway wagon 50. In detail, the railway vehicle 100 may comprise a plurality of railway wagons and hence one or more first railway wagons and/or one or more second railway wagons. In particular, each of said first and second railway wagons 1, 50 extends longitudinally between a first and a second longitudinal end portion 2, 3; the first and second railway wagons 1, 50 are engaged with each other at the second longitudinal end portion 3 of the first railway wagon 1 and at the first longitudinal end portion 2 of the second railway wagon 50.

Each of said first and second railway wagons comprises a platform 4 that may be made of metallic material, e.g. steel, extending along a plane which in condition of use of the vehicle extends substantially horizontally. The platform 4 has a polygonal shape, in particular rectangular, extending longitudinally between a first and a second end portion. The platform 4 may define the load-bearing frame of the railway wagon.

Figure 6:
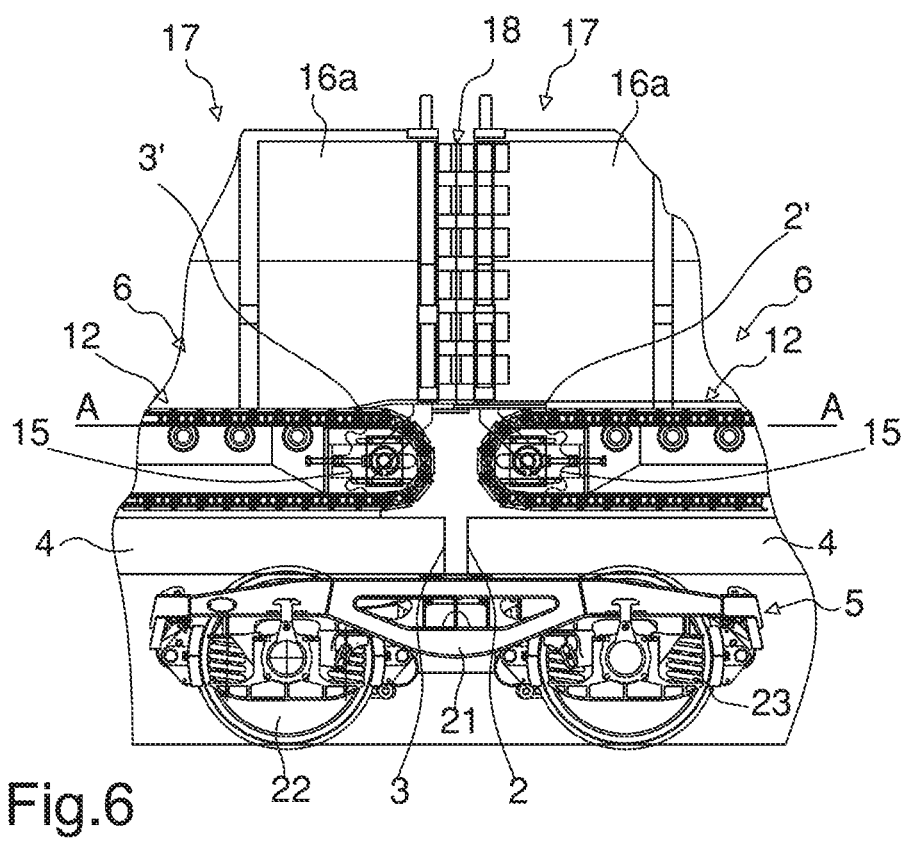
FIG. 6 is a detailed side view of a railway vehicle.

Each railway wagon 1, 50 is supported by at least one carriage 5, in particular in the configuration illustrated in the enclosed figures at least one carriage 5 is shown, comprising at least one axle, in particular two axles, and each of which comprises two train wheels, adapted to transit on rails. In particular, an axle of the railway wagon 1 is configured to support a first railway wagon 1, while the further axle of the same carriage is configured to support the railway wagon 50. Still more particularly, each railway wagon 1, 50 is supported at a longitudinal end by an axle of a carriage 5 and is supported at an opposite longitudinal end by an axle of a further carriage 5; in fact, each carriage 5 is interposed to support both the first wagon 1 and the second railway wagon 50 as illustrated for example in FIGS. 1, 6 and 13. In more detail, the first and the second railway wagon 1, 50 are supported by three carriages 5: one carriage 5 to exclusively support the first railway wagon 1, one carriage 5 to exclusively support the second railway wagon 50, and a further connection carriage 5, placed to support both of the first and of the second railway wagon 1, 50.

Each carriage 5 also comprises a support frame 21, integral with the platform 4, an axle on which two wheels 22 are fit which allow the railway vehicle 100 to be moved along rails (not shown in the enclosed figures) and a plurality of suspensions 23 interposed between the frame 21 of the carriage 5 and the wheels 22. The carriage 5 may be motorized and then comprise at least one motor, in particular an electric motor, active on the axle and configured to transfer a rotational motion to the same wheels 22. Each carriage may have at least one drive wheel 22, in particular all the wheels 22 may be of drive type.

The first railway wagon 1 comprises a conveyor 6 carried by the platform 4 and having an operating section To lying on a plane substantially parallel to the platform 4 and configured to abuttingly receive the material, optionally gravel. The conveyor 6 extends longitudinally between a first and a second longitudinal end portion 2', 3' and extends transversely between a first and a second transverse end portion 2", 3" comprised within the platform 4. The conveyor 6 is configured to move the material relative to the platform 4 at least along an advancement direction A comprised between the first and the second longitudinal end portion 2, 3 of the railway wagon 1. In fact, the first longitudinal end portion 2' is placed at the first longitudinal end portion of the first railway wagon 1 while the second end portion of the conveyor 6 is placed at the second longitudinal end portion of the first railway wagon 1.

The conveyor 6 may comprise at least two toothed wheels 15, e.g. comprising a ring gear or a toothed wheel, each rotating along an axis transverse to the advancement direction A; in particular, each toothed wheel 15 is mounted at the first and second longitudinal end portions 2', 3' of the conveyor 6. Said toothed wheels 15 are connected to each other in motion by means of a drive element 12 for example comprising at least one belt or at least one chain wound as a closed loop around said pairs of toothed wheels 15; in particular, a single belt or chain is wound around a pair of toothed wheels 15, connecting them in rotation. In detail, the closed loop path comprises a straight forward section 12a, a straight return section 12b and a first and a second curved connecting section 12c, 12d which connect the forward section and the return section. The first and second sections have respective concavities facing each other at which the toothed wheels 15 are arranged.

The conveyor 6 comprises at least one actuator 14, in particular a motor, configured to move said belt and/or chain: the motor transfers a rotary motion (directly or through an intermediate transmission member, not shown in the enclosed figures) to at least one toothed wheel 15, such to engage and guide said belt and/or chain in motion.

It is useful to observe that a toothed wheel 15 connected to the actuator 14 is defined a drive wheel, in particular all the wheels 15 comprised by the drive element 12 are drive wheels. The drive element 12 also comprises at least one first belt or chain between said belts and/or chains arranged at the first transverse end of the conveyor 6 and a second belt or chain between said belts and/or chains located at the second transverse end of the conveyor 6.

The drive element 12 comprises a plurality of plates 13 that may be made of metallic material, e.g. steel, configured to move the material along the advancement direction A. Each plate is mainly extended along a direction orthogonal to the operating section To; the plates of said plurality are all parallel to each other and aligned along a direction parallel to the operating section To. In detail, the plates 13 are flanked and adjacent to each other along the entire defined closed loop path of the drive element 12. In conditions of use of the railway vehicle 100, at least part of the plates 13 located along the straight forward section 12a (placed above the straight return section 12b), define at least one part of the operating section To of the conveyor 6.

Each plate 13 extends in thickness between an outer surface and an inner surface; the inner surface of each plate 13 is facing towards the drive element 12 while the outer surface is facing the opposite side with respect to the closed loop path defined by said drive element 12. Each plate 13 extends widthwise between a first and a second transverse end coinciding respectively with the first and the second transverse end 2", 3" of the conveyor 6.

Figure 11:
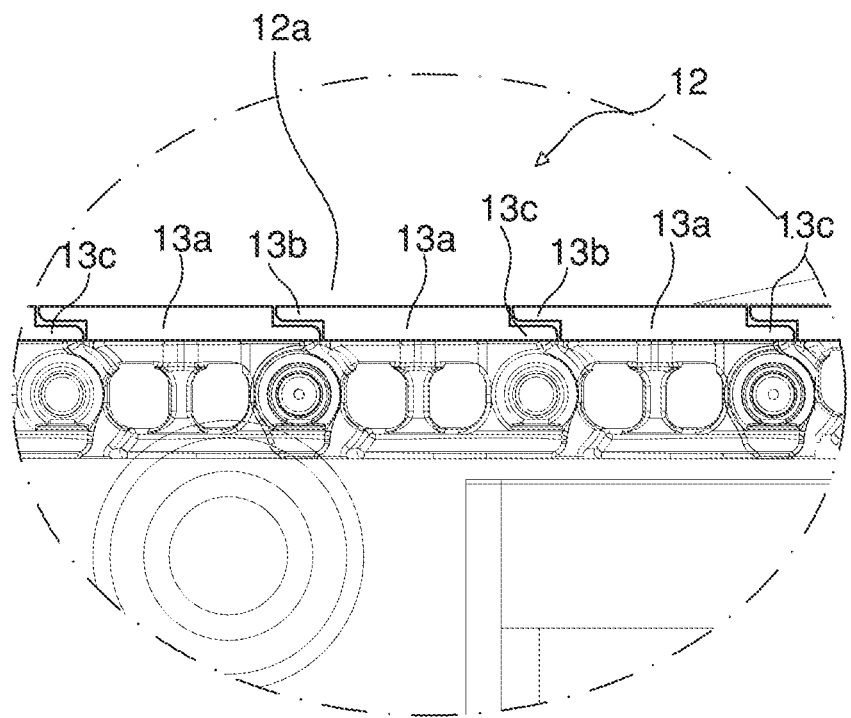
FIGS. 11 and 12 are detailed side views of a conveyor of a railway wagon illustrating different operating zones of said conveyor.
Figure 12:
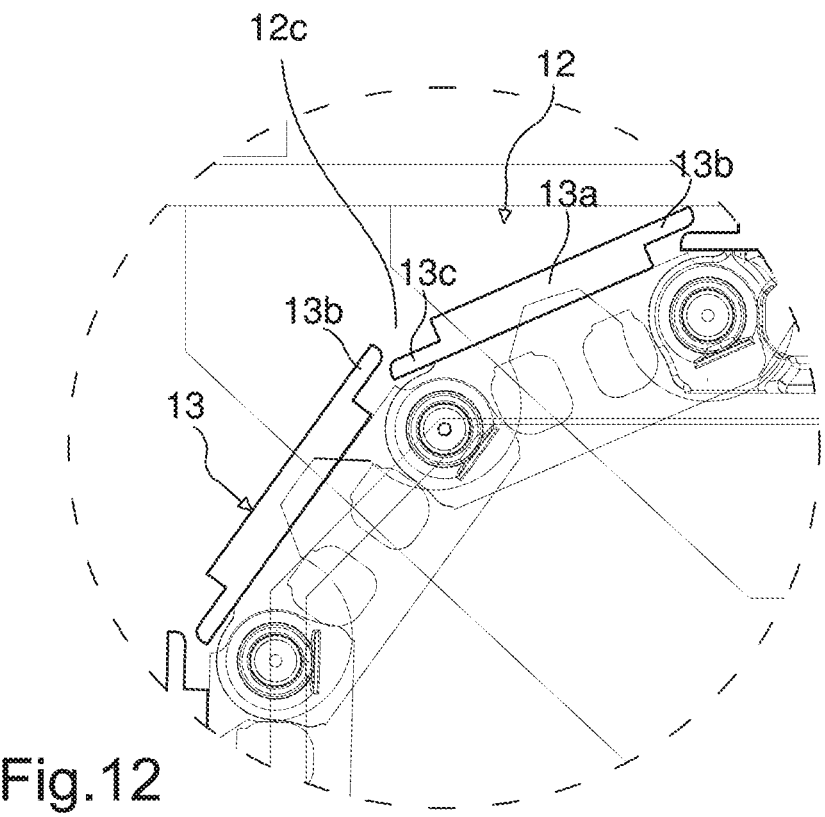

As shown in FIG. 11 and FIG. 12, each plate 13 comprises a central body 13a, a front projection 13b emerging from the central body 13a and a rear projection 13c emerging from the central body 13a on the opposite side with respect to the front projection 13b. The central body 13a and the front projection 13b define the upper surface of the plate 13 configured to abuttingly receive the material. At least at the straight forward section 12a, the front projection 13b of a plate 13 is configured to be superimposed on a rear projection 13c of an adjacent plate 13 in a manner such that the upper surfaces of said plates define an essentially continuous flat surface configured to support and move the material. Indeed, as is visible in the closed drawings, the plates 13 have shaped profiles (see for example FIGS. 11 and 12) in a manner such that a plate may substantially be connected to an adjacent plant to define, at least for the straight forward section, a surface that is substantially smooth or with limited joints.

The first railway wagon 1 also comprises at least one first and one second lateral wall 16a, 16b extending along the longitudinal extension of the conveyor 6; the lateral walls 16a, 16b are opposite each other and emerging respectively from the first and from the second transverse end portion 2", 3" of the conveyor 6 on the side opposite the platform 4. It is useful to observe the absence of lateral walls emerging from the conveyor 6 and extending transverse to the lateral walls 16a, 16b interposed between a conveyor 6 of a railway wagon and a conveyor 6 of an adjacent railway wagon.

The first lateral wall 16a of the first railway wagon 1, since it has a longitudinal extension comprised within the longitudinal ends of the conveyor 6, results spaced from a first lateral wall 16a belonging to an adjacent railway wagon to define a first lateral opening. Analogously two second lateral walls 16b of two adjacent railway wagons are also spaced from each other to define a second lateral opening.

In other words, the lateral walls 16a, 16b, together with the conveyor 6, define a housing space 17 for containing material, optionally gravel, delimited only transversely, except at the first and at the second lateral opening, in a manner such to allow a possible direct communication between the first and the second railway wagon.

As described above, the railway vehicle 100 comprises the second railway wagon 50 having a structure analogous to that of the first railway wagon 1. The second railway wagon 50 also comprises a conveyor 6 carried by the platform 4 and having an operating section To configured to abuttingly receive the material. The conveyor 6 of the second railway wagon 50 has characteristics in accordance with that described above relative to the conveyor 6 of the first railway wagon 1.

In a manner entirely analogous with respect to the first railway wagon 1, the second railway wagon 50 comprises a first and a second lateral wall 16a, 16b extending along the longitudinal extension of the conveyor 6. It is useful to observe that said first and second lateral walls 16a, 16b of the second railway wagon 50 in turn have characteristics in accordance with that described above relative to the lateral walls 16a, 16b of the first railway wagon 1.

Figure 7:
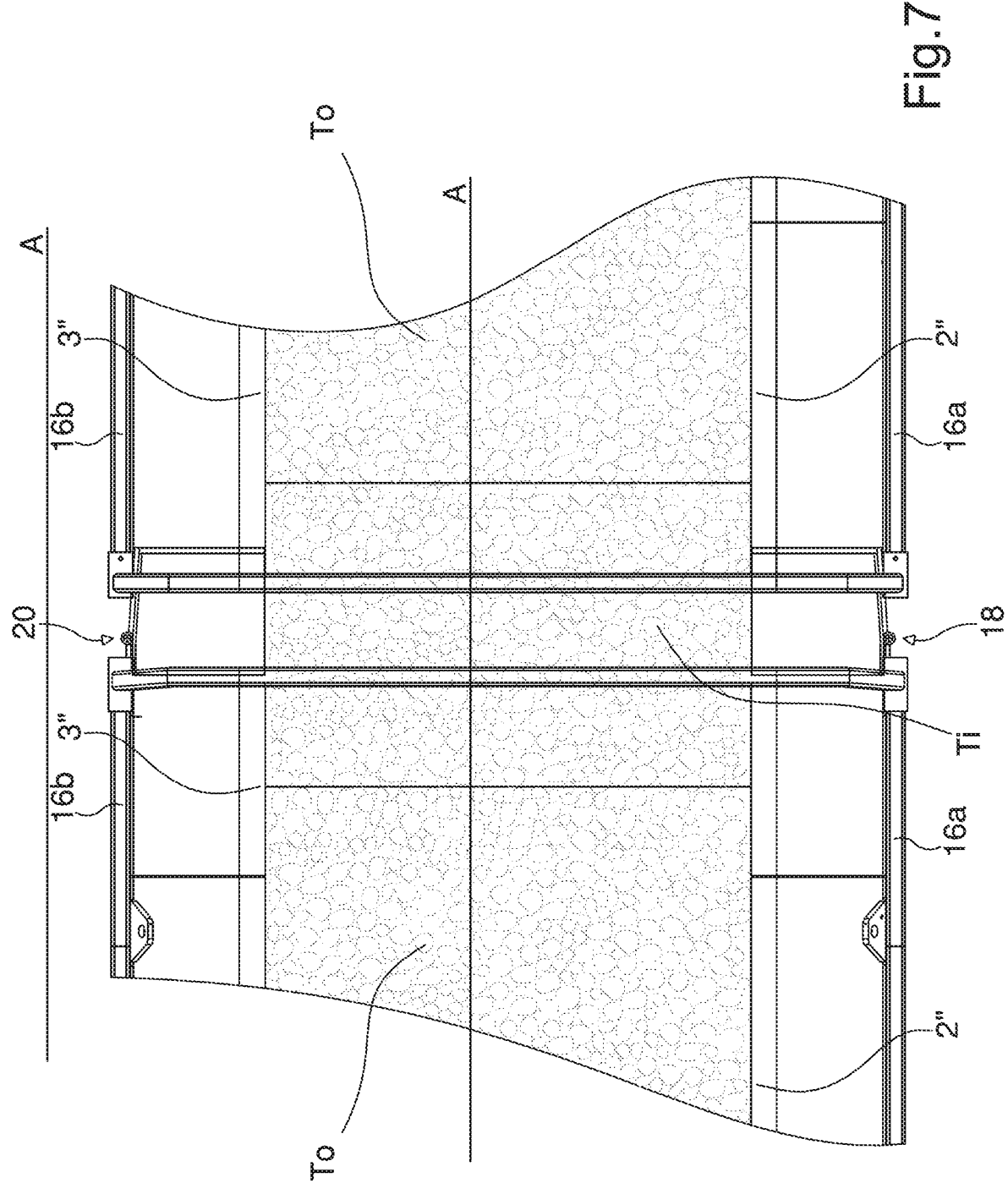
FIG. 7 is a top view of a railway vehicle.
Figure 9:
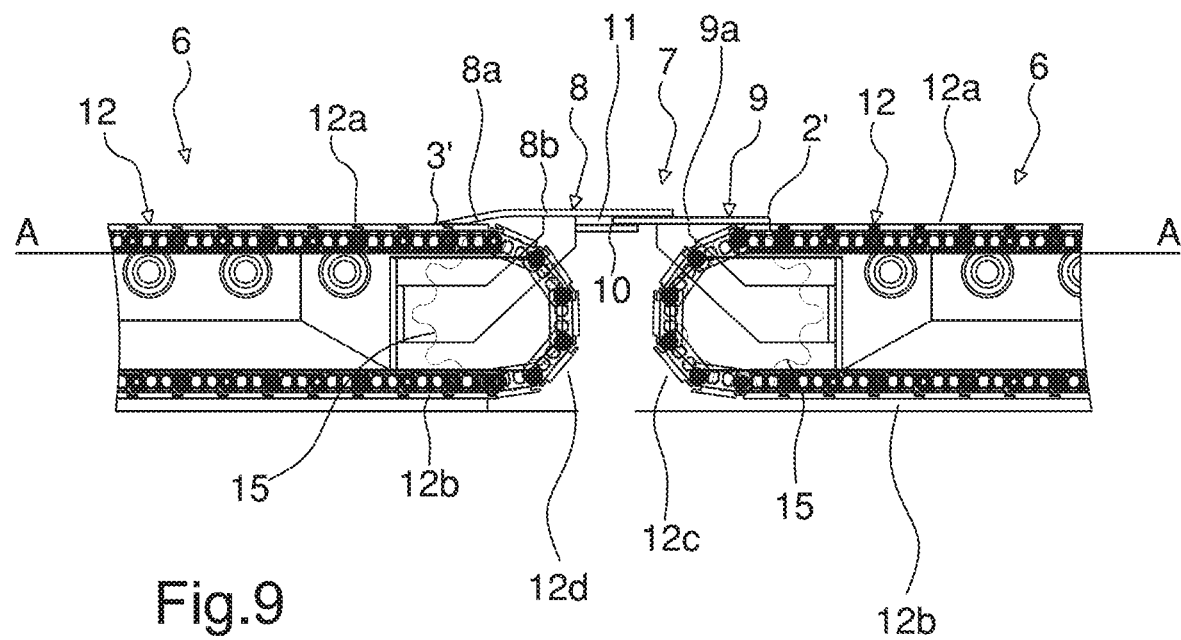
FIG. 9 is a detailed view of a pair of conveyors and a connection device usable on a railway vehicle.
Figure 10:
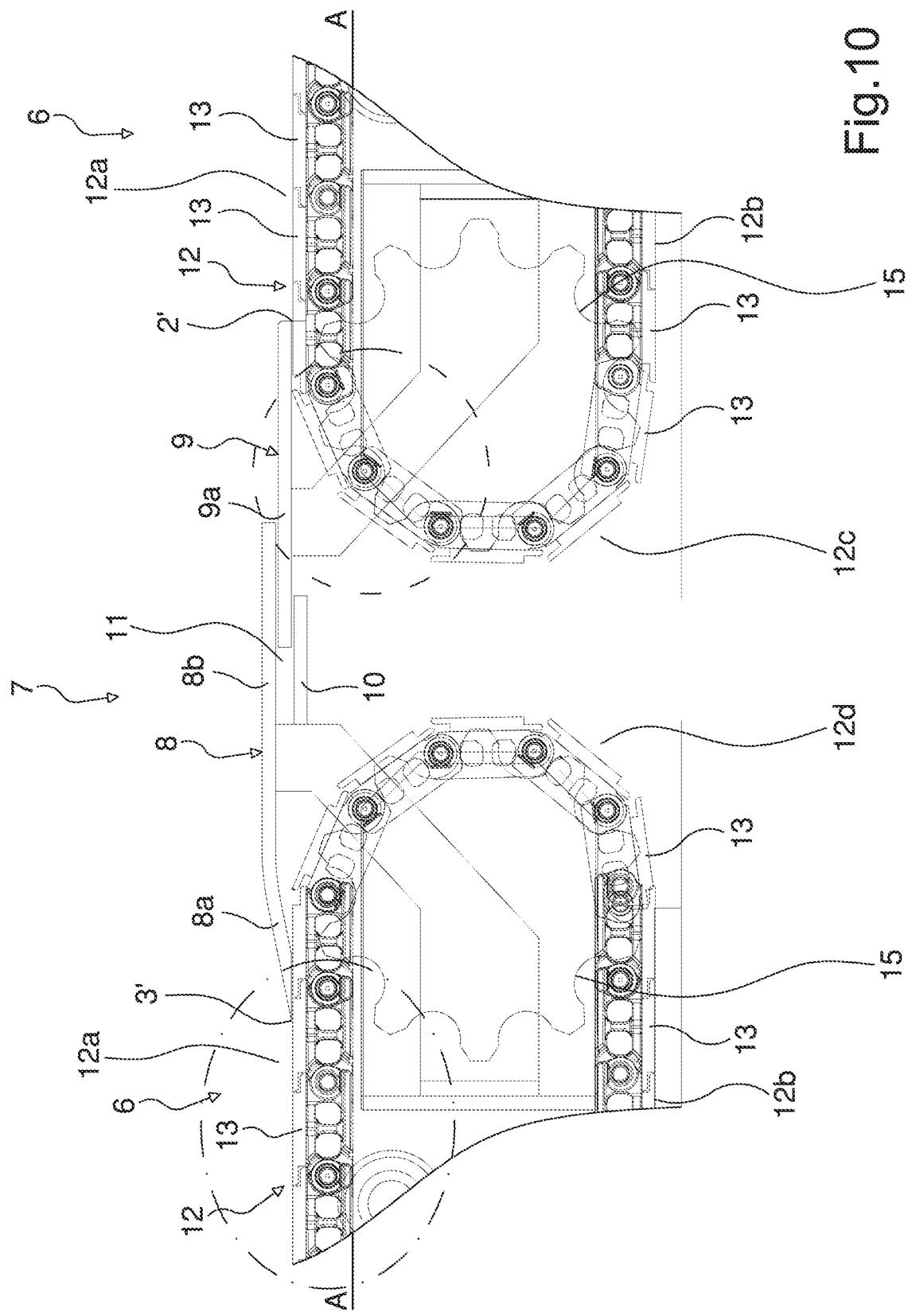
FIG. 10 is a detailed view of the pair of conveyors of FIG. 9.

The railway vehicle 100 comprises at least one connection device 7, shown in detail in FIGS. 7, 9 and 10, configured to place in communication said first and second railway wagons 1, 50 to define an intermediate section Ti for connecting the operating sections To of the conveyors 6 of the first and of the second railway wagon 1, 50. The connection element 7 comprises at least one first support element 8, constrained to the conveyor 6 of the first railway wagon 1 and extending as an extension of the operating section To of the conveyor 6, in particular emerging from the second longitudinal end portion 3 of the first railway wagon 1, approaching the conveyor 6 of the second railway wagon.

The connection device 7 also comprises a second support element 9 constrained to the conveyor 6 of the second railway wagon 50 and extending as an extension of the operating section To of the conveyor 6, in particular emerging from the first longitudinal end portion 2 of the second railway wagon 50, approaching the conveyor 6 of the first railway wagon 1.

Specifically, the first and the second support element 8, 9 of the connection device 7 have respective surfaces for receiving the material superimposed on each other along a direction orthogonal to the intermediate section Ti, in fact constituting a structure of connection between the first and the second railway wagon 1, 50.

As is visible in FIG. 10, the first support element comprises 8 at least one plate having a flat section 8b, substantially parallel to the lying plane of the operating section To, and extending away from the conveyor 6 of the first railway wagon 1 beyond the platform 4; the first support element 8 also comprises a raised section 8a, tilted with respect to the operating section To and emerging from the same, interposed between the flat section 8b of the first support element 8 and the operating section To of the conveyor 6 of the first railway wagon 1. In other words, the sections 8a and 8b of the plate represent a ramp structure, so that the material may be moved away from the conveyor 6 of the first railway wagon 1, approaching the second railway wagon 50.

The first support element 8 also comprises an auxiliary support element 10, facing the second support element 9 and arranged along a direction parallel to the section 8b of the plate. The auxiliary support element 10, in conditions of use of the railway vehicle 100, is superimposed and spaced from the section 8b of the plate itself along a direction transverse to the operating section Ti to define a guide 11 adapted to receive the second support element 9.

Analogous to the first support element 8, the second support element 9 comprises at least one plate 9a having a flat section and extending away from the conveyor 6 of the second railway wagon 50 beyond the platform 4. In conditions of use of the railway vehicle 100, the plate 9a of the second support element 9 is placed at least partially below the section 8b of the plate of the first support element 8 and configured to receive and move the material, optionally gravel, towards the second railway wagon 50. The plate 9a of the second support element 9 is engaged with the guide 11 and configured to slide within the guide 11 itself. The guide 11, in addition to allowing the relative sliding between first and second support elements, also allows the relative rotation thereof so as to allow the compensation of possible misalignments of the first and second railway wagons, which for example may be generated while traveling on a curve.

Figure 8:
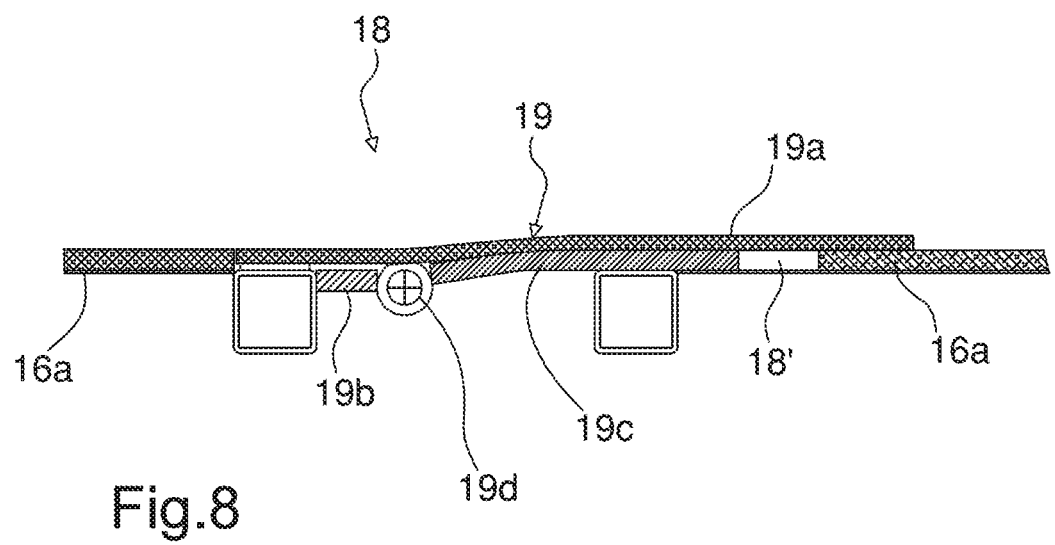
FIG. 8 is a detailed view of a lateral containment device usable on a railway vehicle.
Figure 13:
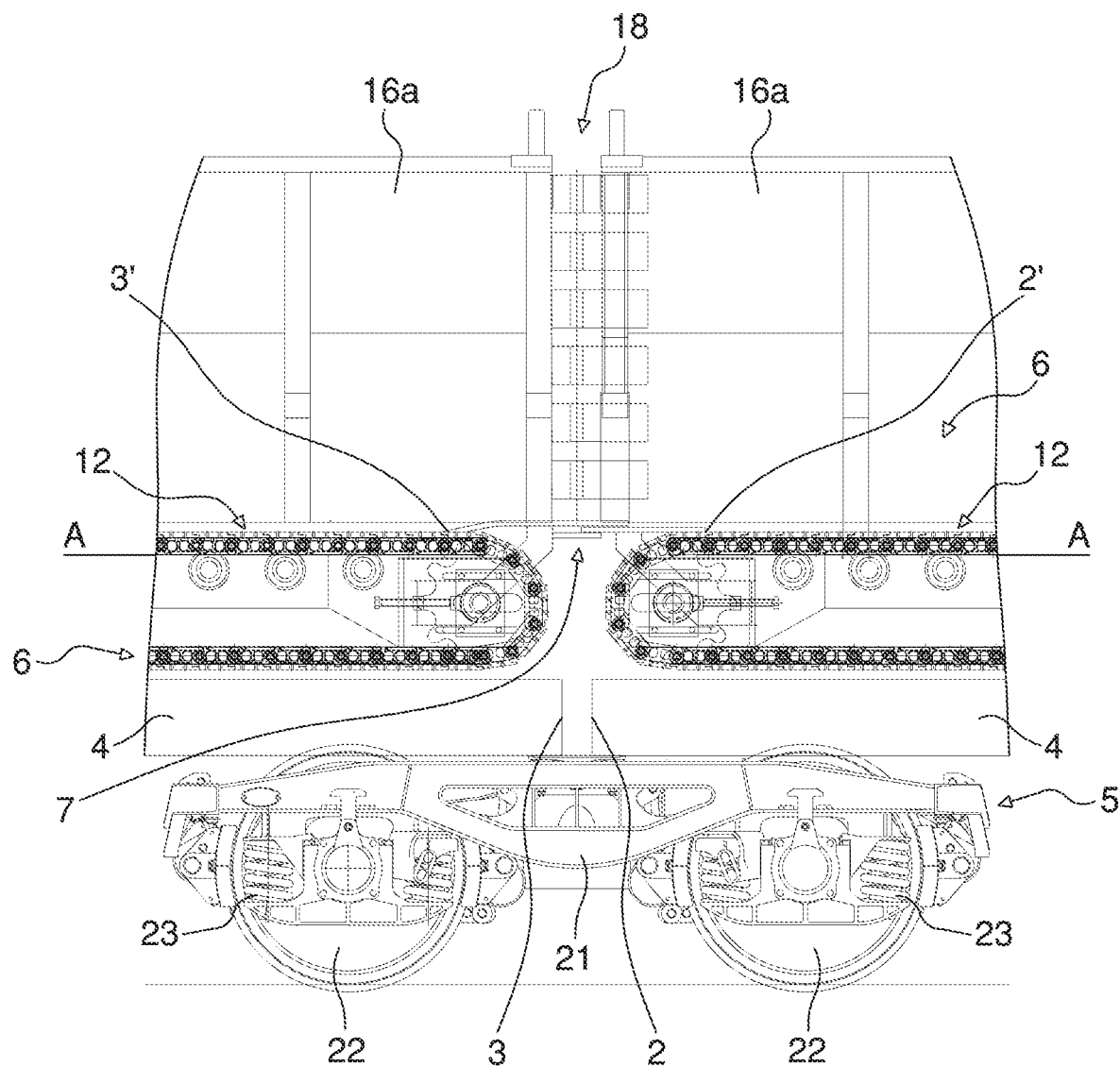
FIG. 13 is a further side view of a railway vehicle, illustrating in detail a zone for connecting two adjacent railway wagons.

The railway vehicle 100 also comprises at least one containment device 18, shown in detail in FIG. 8 and FIG. 13, configured to at least partially occlude said first and second lateral openings defined between two adjacent railway wagons. In particular, the containment device 18 comprises at least one first occlusion element 19 engaged at the first lateral wall 16a of a railway wagon and extending towards the first lateral wall 16a of an adjacent railway wagon, such to longitudinally extend the housing space 17 for containing material up to being superimposed at least partly on the first lateral wall 16a of an adjacent railway wagon to at least partly occlude said first lateral opening.

The first occlusion element 19 comprises at least one first and one second containment plate 19b, 19c and at least one connection body 19d. The first containment plate 19b is engaged with the first lateral wall 16a of the first railway wagon 1 and extends approaching the first lateral wall 16b of the second railway wagon 50. The second containment plate 19c is engaged with the connection body 19d extending towards the first lateral wall 16a of the second railway wagon 50. Finally, the connection body 19d is fixed and interposed between said first and second containment plates 19b, 19c in order to allow the relative rotation along an axis transverse to the operating section To. In other words, the connection body 19d defines a constraint of hinge type between said first and second containment plates 19b, 19c.

Furthermore the first occlusion element 19 comprises at least one laminar coating body 19a made of plastic material, e.g. polyethylene, to cover the first and second containment plates 19b, 19c and the connection body. In particular, the laminar coating body 19a also has a longitudinal extension such to occlude the first lateral opening. In more detail, the laminar coating body 19a extends between a first longitudinal end constrained to the first containment plate 19b and dedicated to the exclusive covering of the same first containment plate 19b, and a second longitudinal end dedicated to the exclusive covering of the second containment plate 19c. It is useful to note that the laminar coating body 19a is free to translate at the second containment plate 19c, not being in any manner constrained to the second containment plate 19c itself.

The laminar coating body 19a, together with the lateral wall 16a, defines a slide guide 18' configured to engagingly receive the second plate 19c and allow the sliding thereof within the same guide 18'.

The containment device 18 also comprises at least one second occlusion element 20 illustrated in FIG. 7, engaged at the second lateral wall 16b of a railway wagon and extending towards the first lateral wall 16b of an adjacent railway wagon. Analogous to the first occlusion element 19, the second occlusion element 20 furthermore comprises at least one laminar coating body 19a made of plastic material. In other words, the second occlusion element 20 represents a dual device at the first occlusion element 19 located in proximity to the second transverse end of the conveyor 6.

Finally, it is useful to observe that the containment device defines a longitudinally continuous housing space such to allow the containment of the material and the movement thereof between two adjacent wagons, preventing lateral outflows.

Figure 5:
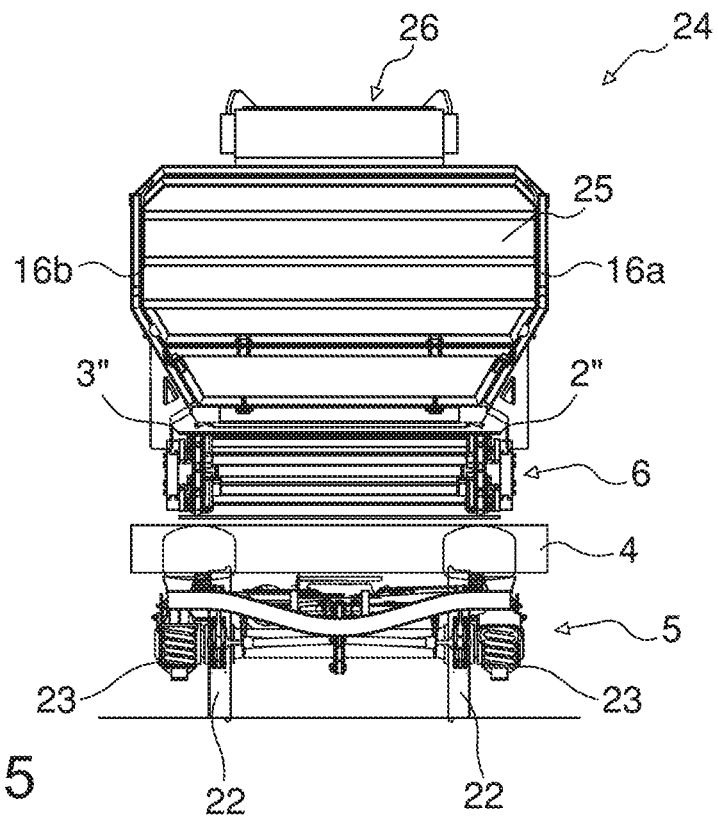
FIG. 5 is a front view of a railway wagon.

The railway vehicle 100 may also comprise a tail railway wagon 24, shown in FIG. 5, in accordance with that described above relative to the first or second railway wagon 1, 50. The tail railway wagon 24 comprises at least one tail lateral wall 25 emerging from the platform 4 and connecting the first and second lateral parts 16a, 16b of the tail railway wagon 24, thus defining a housing space delimited at the top by a free edge.

Figure 2:
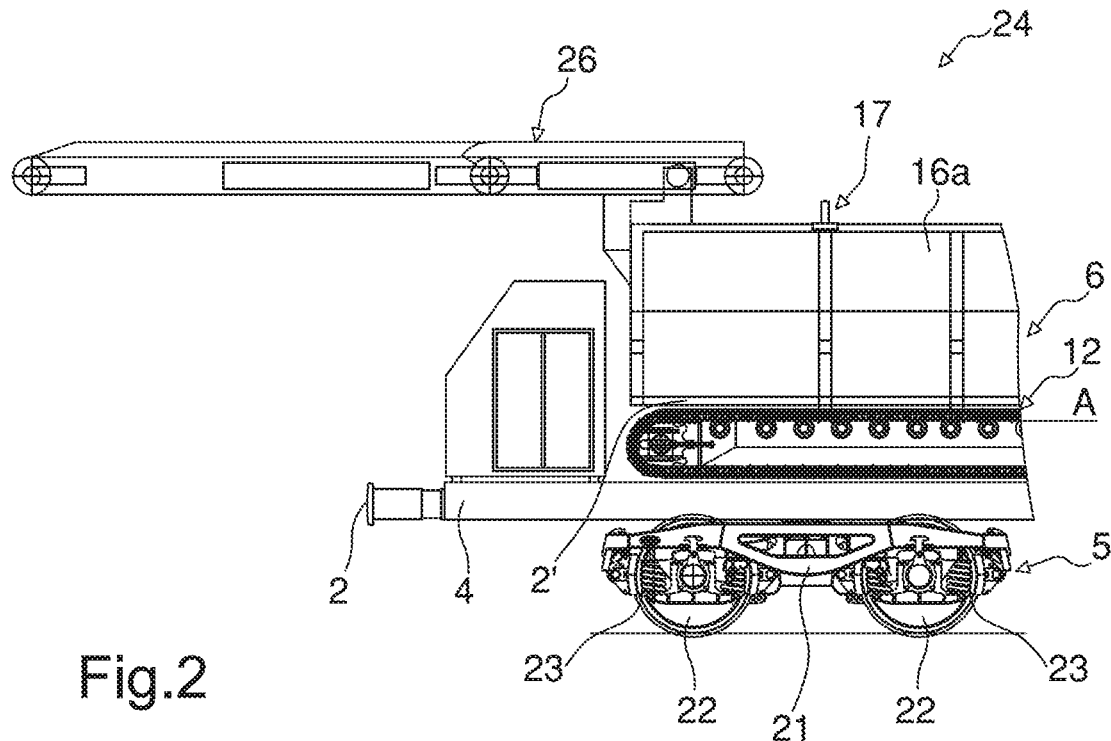
FIGS. 2 and 3 are side views of a station for loading a railway wagon of a vehicle.
Figure 3:
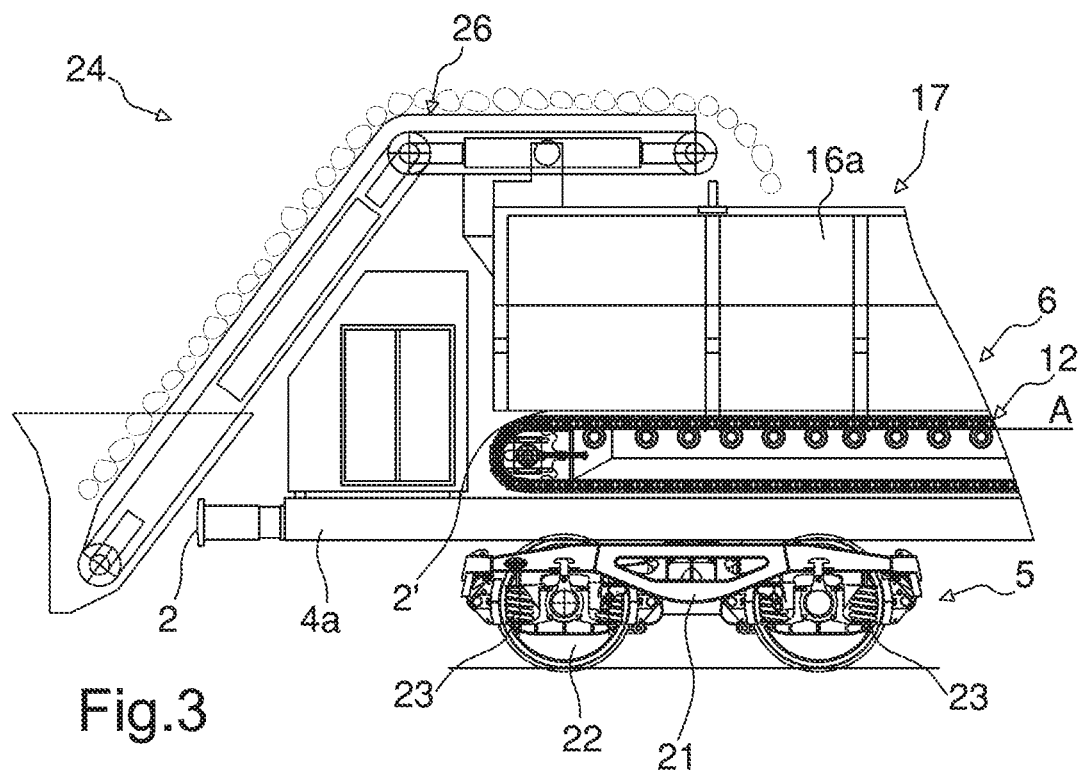

The tail railway wagon 24 may comprise a loading conveyor 26 arranged at the free edge and configured to move the material within the housing space. The movement of the material within the housing space is made possible following the movement of the loading conveyor 26 from a rest position, shown in FIG. 2, wherein the loading conveyor 26 extends longitudinally along a prevalent development direction substantially parallel to the operating section To, to a loading position, shown in FIG. 3, wherein the loading conveyor 26 is tilted with respect to the direction of the operating section To in a manner such to allow, as stated above, the picking up of the material from a feed station and the movement thereof within the housing space and subsequently towards at least one between the first or the second railway wagon 1, 50. In the enclosed figures, the tail wagon 24 that was schematized is to be intended as first railway wagon.

Figure 4:
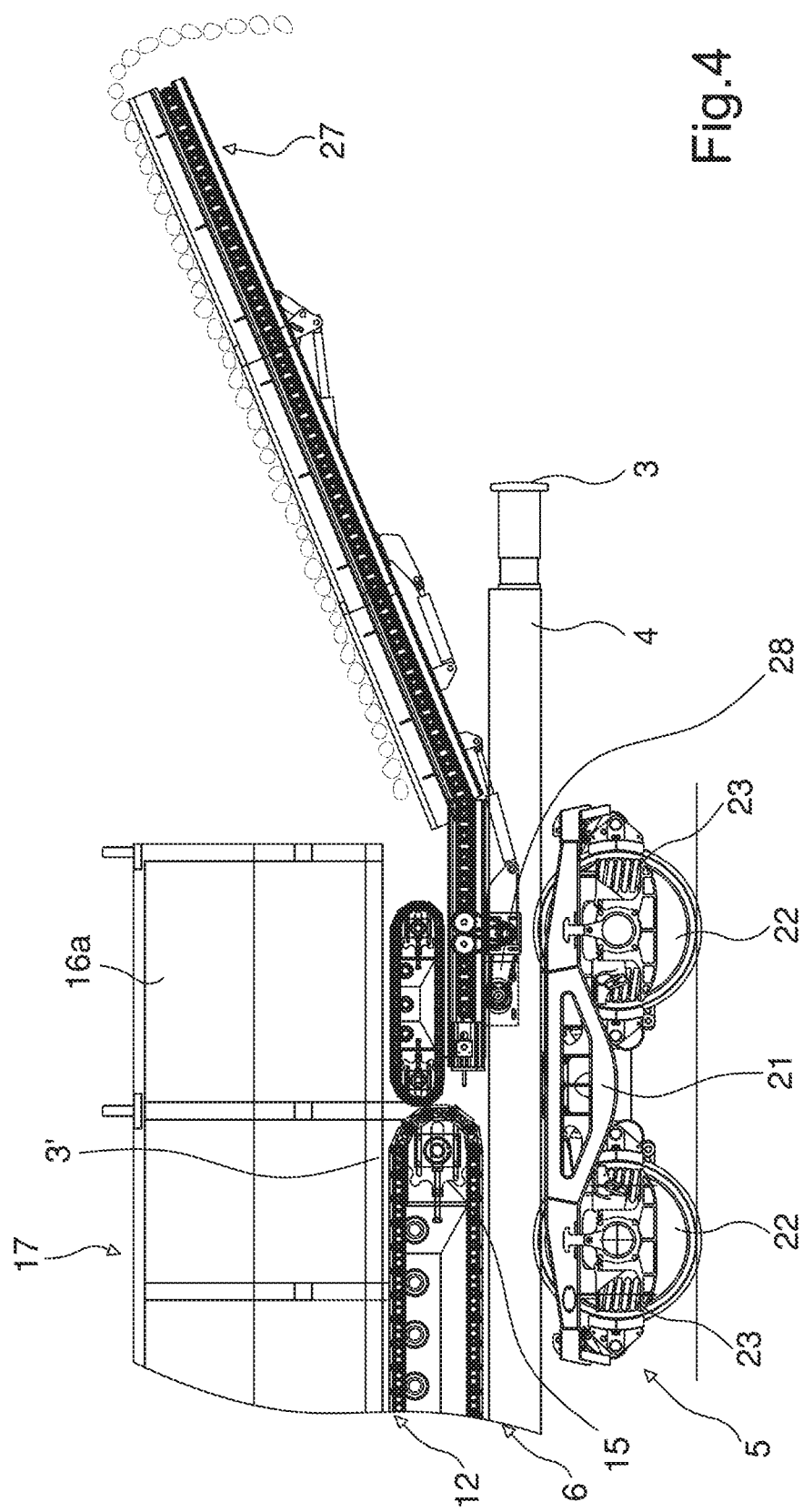
FIG. 4 is a side view of a station for unloading a railway wagon of a vehicle.

The railway vehicle 100 may comprise an unloading conveyor 27, illustrated in FIG. 4, carried by platform 4 of at least one railway wagon and configured to receive the material from a railway wagon and pour it outside the housing space, in particular at the railway ballast. The unloading conveyor 27 may also be movable by rotation according to an axis transverse to the operating section To and coplanar to the operating section To itself, from a raised position in which it has a longitudinal prevalent development direction substantially orthogonal to the abovementioned plane where the operating section To lies (FIG. 1), to a lowered position in which it has a longitudinal prevalent development direction substantially incident with respect to the operating section To (FIG. 4). In addition, the unloading conveyor 27, in addition to being movable by rotation as described above, is movable by rotation along an axis transverse, in particular orthogonal, to the plane where the operating section To lies.

The loading conveyor 26 and the unloading conveyor 27 may comprise conventional belt conveyors with rubber surfaces or conveyors in accordance with that described above. The loading and unloading conveyors 26, 27 may be moved, for example by a motor 28 of direct current or alternating current electric type, or an internal combustion engine, or an oil-pressure or pneumatic motor having a nominal or maximum power comprised between 1 kW and 1000 kW. The motor 28 is illustrated as a non-limiting example of the invention in FIG. 4 relative to the unloading conveyor 27.

The railway vehicle 100, in the embodiment shown in FIG. 1, comprises two railway wagons and in particular it has: a tail railway wagon 24 for loading the material (e.g. gravel on the vehicle), a railway wagon comprising an unloading conveyor 27 configured to allow the unloading of the material (e.g. the gravel) from the vehicle 100. The railway vehicle 100 may also comprise a plurality of middle wagons, and each of which may be in accordance with the above-reported description with reference to the first railway wagon or second railway wagon 1, 50.

Railway Wagon

Also forming the object of the present invention is a railway wagon for moving material, in particular gravel, comprising a platform 4, a conveyor 6 and at least one carriage 5 in accordance with that described above. The railway wagon comprises a connection device 7 which on one side is firmly engaged with the platform 4 and/or with the conveyor 6 of said railway wagon and on the other side is configured to be engaged with a further railway wagon. The connection device 7 is in accordance with that previously described.

In a first embodiment of the railway wagon, the connection device 7 comprises a first support element 8 and a second support element 9 engaged with the first support element 8, and such support element 9 is configured to be engaged with a further railway wagon in accordance with that described above.

In a second embodiment, said railway wagon comprises: at least one connection device 7 in accordance with that described above, engaged with a first longitudinal end 2' of the conveyor 6 and at least one connection device 7 engaged with a second longitudinal end 3' of the same conveyor 6.

In a third embodiment, said railway wagon comprises at least one first and one second support element 8, 9 in accordance with that described above. The first support element 8 is engaged with a second longitudinal end 3' of the conveyor 6 of the railway wagon, while the second support element 9 is engaged with a first longitudinal end 2' of a conveyor 6 of a further adjacent railway wagon.

Connection Device

Also forming the object of the present invention is a connection device 7 which on one side is configured to be firmly engaged with the platform 4 and/or with the conveyor 6 of a railway wagon and on the other side is configured to be engaged with a further adjacent railway wagon. In particular, the connection device 7 has the same characteristics in accordance with that described above.

In a first embodiment, the connection device 7 comprises a first support element 8 and a second support element 9 engaged with the first support element 8, and such second support element 9 is configured to be engaged with a further railway wagon in accordance with that described above.

In a second embodiment, said railway wagon comprises at least one first and one second support element 8, 9 in accordance with that described above, in which said first support element 8 is configured to be engaged with a second longitudinal end 3' of the conveyor 6 of a railway wagon, while the second support element 9 is configured to be engaged with a first longitudinal end 2' of a conveyor 6 of a further adjacent railway wagon.

Containment Device

Also forming the object of the present invention is a containment device 18, in accordance with that described above, configured to at least partially occlude the first and second lateral openings defined between two adjacent railway wagons. In detail said containment device 18 comprises at least one first occlusion element 19, in turn comprising a first and a second containment plate 19b, 19c, at least one connection body 19d and at least one laminar coating body 19a made of plastic material to cover the first and the second containment plate 19b, 19c and the connection body 19d. Said occlusion device 19 is engaged at the first lateral wall 16a of a railway wagon and extending towards, in particular in engagement with, the first lateral wall 16a of an adjacent railway wagon, such to longitudinally extend the housing space 17, in particular defining a longitudinally continuous housing space for containing material, optionally gravel.

The containment device 18 also comprises at least one second occlusion element 20, dual with the occlusion element 19, engaged at the second lateral wall 16b of a railway wagon and extending towards the first lateral wall 16b of an adjacent railway wagon.

Finally, it is useful to observe that the containment device 18 defines a longitudinally continuous housing space such to allow the containment of the material, optionally gravel, and the movement thereof between two adjacent wagons, preventing lateral outflows.

Process for Moving Inert Material

Also forming the object of the present invention is a process for moving material, optionally gravel, for example by using the railway vehicle 100 in accordance with the above-reported description and/or in accordance with any one of the enclosed claims.

The process comprises a first step for loading the material above a first railway wagon by means of a loading conveyor 26, which pours said material within the containment space 17, in particular above the conveyor 6. The process provides for a step for moving the material (gravel) by means of the conveyor 6 along a advancement direction A between the first and second end portions of the first railway wagon 1. The conveyor 6 is configured to guide the material on the connection device 7 which allows transporting the material from the conveyor 6 of the first railway wagon 1 to the conveyor 6 of a second railway wagon adjacent to the first railway wagon 1. The material moved onto the conveyor of the second railway wagon 50 is always moved along a advancement direction A between a first longitudinal end portion 2 of the second railway wagon 50 and a second longitudinal end portion 3 of the same second railway wagon 50. The process may provide for a further step for moving the material, in particular gravel, on a further adjacent wagon, or it may provide for a step for unloading the material from the conveyor 6, for example by means of a unloading conveyor 27, consisting of pouring said material outside the containment space 17, at the railway ballast.

The present invention may be embodied to provide advantages such as a railway vehicle, due to the connection device, and optionally to the containment device, allows the transport and the movement of a high quantity of material, e.g. gravel, more than the quantity transportable by the known railway vehicles.

In addition, due to the use of the connection device and possibly of the containment device, the railway wagons and the vehicle have a simple and compact structure capable of effectively moving the material along the vehicle. Due to the presence of the connection device and possibly of the containment device, the railway vehicle is capable of moving the material, e.g. gravel, along the vehicle by using limited power, thus allowing saving in terms of electrical energy consumptions and costs for the installation of powerful motors.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A railway vehicle for moving material comprising:
    a first railway wagon extending longitudinally between a first longitudinal end portion and a second longitudinal end portion of the first railway wagon, and
    a second railway wagon extending longitudinally between a first longitudinal end portion and a second longitudinal end portion of the second railway wagon,
    wherein said first railway wagon engages the second railway wagons at the second longitudinal end portion of the first railway wagon and at the first longitudinal end portion of the second railway wagon,
    wherein each of said first and second railway wagons comprises:
        a platform,
        a carriage configured to support the platform and allow the movement of the corresponding first or second railway wagon to move along rails, and
        at least one conveyor carried by the platform and having an operating section configured to receive aggregate material, the conveyor being configured to move the aggregate material relative to the platform at along a advancement direction between the first and second longitudinal end portions of the corresponding first or second railway wagon,
    wherein the railway vehicle further comprises a connection device carried by at least one of said first and second railway wagons and configured to define an intermediate section of connection of the operating sections of the conveyors of the first and second railway wagons,
    wherein the connection device comprises:
        at least one first support element extending as an extension of the operating section of the conveyor of the first wagon, approaching the conveyor of the second wagon.

2. The railway vehicle according to claim 1, wherein at least part of the first support element emerges from the second longitudinal end portion of the first railway wagon, approaching the second railway wagon.

3. The railway vehicle according to claim 1, wherein the first support element comprises a plate having at least one flat section, wherein the plate of the first support element comprises a raised section emerging from the operating section of the conveyor of the first wagon, said raised section being interposed between the flat section of said plate of the first support element and the operating section of the conveyor of the first railway wagon.

4. The railway vehicle according to claim 1, wherein the connection device comprises at least one second support element extending as an extension of the operating section of the conveyor of the second wagon, approaching the conveyor of the first wagon.

5. The railway vehicle according to claim 4, wherein at least part of the second support element emerges from the first longitudinal end portion of the second railway wagon, approaching the first railway wagon.

6. The railway vehicle according to claim 4, wherein the connection device comprises at least one first support element extending as an extension of the operating section of the conveyor of the first wagon, approaching the conveyor of the second wagon,
    wherein the first and second support elements of the connection device have respective receiving surfaces of the material, and
    wherein the first and second support elements of the connection device being at least partly superimposed on each other along a direction transverse to said receiving surfaces of the material.

7. The railway vehicle according to claim 4, wherein the second support element comprises a plate having at least one flat section, wherein the plate of the second support element is at least partly arranged, in conditions of use of the railway vehicle, below the plate of the first support element.

8. The railway vehicle according to claim 1, wherein the connection device comprises at least one auxiliary support element facing the first support element, with respect to a direction orthogonal to the platform.

9. The railway vehicle according to claim 8, wherein the connection device comprises at least one second support element extending as an extension of the operating section of the conveyor of the second wagon, approaching the conveyor of the first wagon, wherein the auxiliary support element defines, in cooperation with the first support element, a guide adapted to receive the second support element.

10. The railway vehicle according to claim 8, wherein the auxiliary support element is spaced from the first support element with respect to a direction orthogonal to the receiving surface the material of said first support element.

11. The railway vehicle according to claim 1, wherein the conveyor of each railway wagon comprises:
at least one drive element arranged according to a closed path, and
a plurality of plates constrained to the drive element and movable together with the latter, the plates of said plurality are configured to define the operating section and move the material along the advancement direction,
wherein the plates of said plurality are flanked one another along the entire closed path of the drive element.

12. The railway vehicle according to claim 11, wherein the closed loop path defined by the drive element comprises:
a straight forward section,
a straight return section, and
a first and a second curved connecting sections which connect the forward section and the return section, wherein said first and second sections have respective concavities facing each other,
wherein the straight forward section, in conditions of use of the railway vehicle, is placed above the straight return section, and
wherein at least one part of the plates arranged on the straight forward section define the operating section of the conveyor.

13. The railway vehicle according to claim 11, wherein each plate of said plurality extends in thickness between an outer surface and an inner surface, in which the inner surface of each plate is facing towards the drive element while the outer surface is facing towards the opposite side with respect to the closed loop path defined by said drive element,
wherein each plate comprises:
a central body,
a front projection emerging from the central body, and
a rear projection emerging from the central body on the opposite side with respect to the front projection,
wherein the front projection of a plate is configured to be superimposed on a rear projection of an adjacent and immediately consecutive plate,
wherein the central body and the front projection define the upper surface of the plate configured to abuttingly receive the material.

14. The railway vehicle according to claim 1,
wherein the conveyor extends longitudinally between the first and second longitudinal end portions of the railway wagon,
wherein the conveyor of each wagon extends transversely between a first and a second transverse end portion,
wherein the railway vehicle further comprises at least one first and one second lateral wall opposite each other and emerging respectively from the first and second transverse end portions of the conveyor on the side opposite the platform,
wherein the conveyor, together with the first and second lateral walls, define a housing space for containing material,
wherein each railway wagon is devoid of transverse lateral walls interposed between a conveyor of said railway wagon and the conveyor of an adjacent railway wagon,
wherein the first lateral walls of two adjacent railway wagons are spaced apart from each other to define a first lateral opening, and wherein the second lateral walls of two adjacent railway wagons are also spaced apart from each other to define a second lateral opening,
wherein the railway vehicle comprising a containment device configured to occlude at least in part said first and second lateral openings defined between two adjacent railway wagons,
wherein the containment device comprises at least one first occlusion element engaged at the first lateral wall of a railway wagon and extending towards the first lateral wall of an adjacent railway wagon, and
wherein the containment device comprises at least one second occlusion element engaged at the second lateral wall of a railway wagon and extending towards the first lateral wall of an adjacent railway wagon.

15. The railway vehicle of claim 1, wherein the connection device further comprises:
at least one second support element extending as an extension of the operating section of the conveyor of the second wagon, approaching the conveyor of the first wagon, and
at least one auxiliary support element facing the first support element, with respect to a direction orthogonal to the platform.

16. A railway vehicle for moving material comprising at least a railway wagon extending longitudinally between a first and a second longitudinal end portions, wherein the railway wagon comprises:
at least one platform,
at least one carriage configured to support the platform and allow the movement of the railway wagon along rails, and
at least one conveyor carried by the platform and having an operating section configured to receive the material, the conveyor being configured to move the material relative to the platform at least along a advancement direction between the first and second longitudinal end portions of the railway wagon, wherein the conveyor of the railway wagon comprises:
at least one drive element arranged according to a closed path, and
a plurality of plates constrained to the drive element and movable together with the latter, the plates of said plurality are configured to define the operating section and move the material along the advancement direction,
wherein the plates of said plurality are flanked one another along the entire closed path of the drive element.

17. The railway vehicle according to claim 16, wherein the closed loop path defined by the drive element comprises:
a straight forward section,
a straight return section, and
a first and a second curved connecting sections which connect the forward section and the return section, wherein said first and second sections have respective concavities facing each other, wherein the straight forward section, in conditions of use of the railway vehicle, is placed above the straight return section, wherein at least one part of the plates arranged on the straight forward section define the operating section of the conveyor.

18. The railway vehicle according to claim 16, wherein each plate of said plurality extends in thickness between an outer surface and an inner surface, in which the inner surface of each plate is facing towards the drive element while the outer surface is facing towards the opposite side with respect to the closed loop path defined by said drive element, wherein each plate comprises:
a central body,
a front projection emerging from the central body, and
a rear projection emerging from the central body on the opposite side with respect to the front projection,
wherein the front projection of a plate is configured to be superimposed on a rear projection of an adjacent and immediately consecutive plate,
wherein the central body and the front projection define the upper surface of the plate configured to abuttingly receive the material.

19. The railway vehicle according to claim 16 comprising at least one first and one second railway wagons, each of said first and second railway wagons extending longitudinally between a first and a second longitudinal end portions, wherein said first and second railway wagons are engaged with each other at the second longitudinal end portion of the first railway wagon and at the first longitudinal end portion of the second railway wagon, wherein each of said first and second railway wagons comprises the platform, the carriage and the conveyor, and wherein the railway vehicle comprises at least one connection device carried by at least one of said first and second railway wagons and configured to define an intermediate section of connection of the operating sections of the conveyors of the first and second railway wagons.

20. A railway vehicle for moving material comprising at least one first and one second railway wagons, each of said first and second railway wagons extending longitudinally between a first and a second longitudinal end portions, wherein said first and second railway wagons are engaged with each other at the second longitudinal end portion of the first railway wagon and at the first longitudinal end portion of the second railway wagon, wherein each of said first and second railway wagons comprises:
at least one platform,
at least one carriage configured to support the platform and allow the movement of the railway wagon along rails,
at least one conveyor carried by the platform and having an operating section configured to receive the material, the conveyor being configured to move the material relative to the platform at least along a advancement direction between the first and second longitudinal end portions of the railway wagon, wherein the railway vehicle comprises at least one connection device carried by at least one of said first and second railway wagons and configured to define an intermediate section of connection of the operating sections of the conveyors of the first and second railway wagons, wherein the conveyor extends longitudinally between the first and second longitudinal end portions of the railway wagon, wherein the conveyor of each wagon extends transversely between a first transverse end portion and a second transverse end portion, wherein the railway vehicle further comprises at least one first lateral wall and at least one second lateral wall opposite to the at least one first lateral wall, and the first lateral wall and the second lateral wall each emerging respectively from the first transverse end portion and the second transverse end portion of the conveyor on a side opposite the platform, wherein the conveyor, the first lateral wall and the second lateral wall collectively define a housing space for containing material, wherein each railway wagon is devoid of transverse lateral walls interposed between the conveyor of said railway wagon and a conveyor of an adjacent railway wagon, wherein the first lateral walls of two adjacent railway wagons are spaced apart from each other to define a first lateral opening, and wherein the second lateral walls of two adjacent railway wagons are also spaced apart from each other to define a second lateral opening, wherein the railway vehicle includes a containment device are configured to occlude at least in part said first and second lateral openings defined between two adjacent railway wagons, wherein the containment device includes at least one first occlusion element engaged at the first lateral wall of a railway wagon and extending towards the first lateral wall of an adjacent railway wagon, and wherein the containment device includes at least one second occlusion element engaged at the second lateral wall of a railway wagon and extending towards the first lateral wall of an adjacent railway wagon.

* * * * *